Patented Sept. 11, 1923.

1,467,625

UNITED STATES PATENT OFFICE.

HENRY W. SCHOENFELDT, GUSTAV A. REINHARDT, AND ELMER T. McCLEARY, OF YOUNGSTOWN, OHIO.

PROCESS OF WELDING.

No Drawing.      Application filed September 12, 1922.   Serial No. 587,824.

*To all whom it may concern:*

Be it known that we, HENRY W. SCHOENFELDT, GUSTAV A. REINHARDT, and ELMER T. McCLEARY, citizens of the United States, residing at Youngstown, in the county of Mahoning and State of Ohio, have invented a new and useful Improvement in Processes of Welding, of which the following is a full, clear, and exact description.

The present invention relates to a process of welding. In our process, metal is superheated in a furnace and applied to the place where the weld is to be made. The metal as applied is superheated to a temperature sufficient to raise the surface where the weld is to be made to the welding point.

The process may be carried out for welding together two or more pieces of metal, in which case the superheated metal is applied, preferably by pouring into a mold, to the surfaces of the solid metal where the weld is to be made. The process may also be used where the superheated metal, after solidifying, forms the piece to be added by welding, such, for example, as replacing a piece broken or chipped from a casting, or filling up defective places in a casting or other metal article to be mended.

The metal is superheated in any suitable furnace, such as an electric furnace or a furnace fired by gas, oil, coal, or other suitable fuel. We prefer to use an electric furnace because the superheating can be carried out more readily and under better controlled temperature conditions. By superheating is meant heating of the liquid metal considerably above its melting point. In the case of ferrous metal, such as steel or iron, we prefer to superheat the metal to a temperature which we believe to be in the neighborhood of 2700° F. or perhaps higher, although the temperature will be governed to a great extent by the particular character of the weld to be made.

In welding two pieces of iron or steel together, the ends which are to be welded together are preferably enclosed in a mold of molding sand or the like to confine the liquid metal which is to be applied to the surfaces to be welded. The superheated metal is then tapped from the furnace and is poured in its superheated condition. The metal as poured should retain its superheat so that it will raise the surfaces of the solid metal to which it is applied, to the welding point, thereby insuring a firm welded joint between the solid metal and the liquid metal applied thereto. Ordinarily, liquid metal will not weld to solid metal, because of the fact that the surface of the solid metal is not raised to the welding point.

By superheating the metal in a furnace, we can insure that the welding metal has the right chemical composition, and that it is applied at the best temperature to form a solid and substantial weld. We can thus avoid porosity and blow-holes in welds made by the use of the materials which we have found result from a too high and uncontrolled temperature produced by exothermic reactions.

If desired, the solid pieces of metal may be heated in the region of the weld to a temperature below but close to the welding temperature, in which case the welding metal applied need not be superheated to so high a temperature.

The present invention is not limited to all of the details above described, but may be embodied in welding processes within the scope of the following claims.

We claim:

1. The process of welding, including the steps of superheating metal in a furnace and forming the weld with the furnace superheated metal, substantially as described.

2. The process of welding, including the steps of superheating metal in a furnace and applying the thus superheated metal to the surface at which the weld is to be made, at a temperature sufficiently high to raise such surface to the welding point, substantially as described.

3. The process of welding ferrous metals, including the steps of superheating a ferrous metal in a furnace and applying the thus superheated ferrous metal to the surface at which the weld is to be made at a temperature sufficiently high to raise such surface to the welding point, substantially as described.

4. The process of welding ferrous metals, including the steps of superheating a ferrous metal in a furnace to a temperature of at least about 2700° F. and forming the weld with the furnace superheated ferrous metal, substantially as described.

5. The process of welding ferrous metals, including the steps of superheating a ferrous metal in a furnace to a temperature in the neighborhood of 2700° F. and forming the weld with the furnace superheated ferrous metal, substantially as described.

6. The process of welding, including the steps of preheating the surface at which the weld is to be made to a temperature below the welding point, superheating metal in a furnace, and applying the thus superheated metal to the surface at which the weld is to be made, substantially as described.

7. The process of welding metal, including the steps of preheating the solid metal surface at which the weld is to be made to a temperature below its welding point, superheating in a furnace a metal of substantially the same chemical composition as the solid metal, and applying the furnace superheated metal to the surface at which the weld is to be made, substantially as described.

8. The process of welding together two or more pieces of solid metal, including the steps of superheating a body of the same metal in a furnace, and applying the furnace superheated metal to the pieces to be welded, substantially as described.

9. The process of welding together two or more pieces of solid metal, including the steps of preheating the pieces of solid metal in the region of the weld to a temperature below their welding point, superheating a body of the same metal in a furnace, and applying the furnace superheated metal to form the weld, substantially as described.

10. The process of welding, including the steps of superheating metal in an electric furnace under controlled temperature conditions and forming the weld with the furnace superheated metal, substantially as described.

In testimony whereof we have hereunto set our hands.

HENRY W. SCHOENFELDT.
GUSTAV A. REINHARDT.
ELMER T. McCLEARY.